Figure 1:
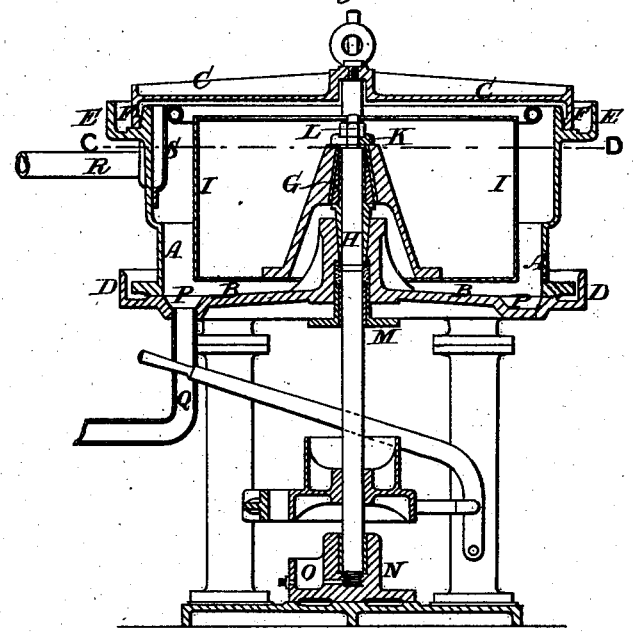

(No Model.) 2 Sheets—Sheet 1.

T. J. MULLINGS.
PROCESS OF EXTRACTING OIL AND FAT AND OILY AND FATTY MATTERS FROM WOOL AND OTHER SUBSTANCES AND THE APPARATUS CONNECTED THEREWITH AND APPLICABLE THERETO.

No. 287,786. Patented Oct. 30, 1883.

Witnesses.
W. H. McBlach
C. A. Speare

Inventor.
Thomas John Mullings
by John J. Halsted, Atty (No Model.)

T. J. MULLINGS.

PROCESS OF EXTRACTING OIL AND FAT AND OILY AND FATTY MATTERS FROM WOOL AND OTHER SUBSTANCES AND THE APPARATUS CONNECTED THEREWITH AND APPLICABLE THERETO.

No. 287,786.

Patented Oct. 30, 1883.

2 Sheets—Sheet 2.

Witnesses
W. H. McLlach
A. Speare

Inventor
Thomas John Mullings
by John J. Halsted
atty

UNITED STATES PATENT OFFICE.

THOMAS J. MULLINGS, OF LONDON, ENGLAND.

PROCESS OF EXTRACTING OIL AND FAT AND OILY AND FATTY MATTERS FROM WOOL AND OTHER SUBSTANCES AND THE APPARATUS CONNECTED THEREWITH AND APPLICABLE THERETO.

SPECIFICATION forming part of Letters Patent No. 287,786, dated October 30, 1883.

Application filed April 12, 1881. (No model.) Patented in England October 21, 1879, No. 4,262; in France April 23, 1880, No. 136,292; in Belgium April 27, 1880, No. 51,298; in Germany April 27, 1880, No. 13,262; in Austria-Hungary, October 14, 1880, No. 20,377 and No. 30,623; in Cape of Good Hope December 20, 1880, No. 13/251; in Victoria December 28, 1880, No. 2,942; in South Australia January 5, 1881, No. 151; in Tasmania January 6, 1881, No. 188; in Queensland February 22, 1881, No. 332; in New South Wales February 28, 1881, No. 909; in New Zealand April 1, 1881, No. 515, and in Spain August 12, 1881, No. 1,597.

*To all whom it may concern:*

Be it known that I, THOMAS JOHN MULLINGS, a subject of the Queen of Great Britain, residing at London, England, have invented a new and improved Process for Extracting Oil and Fat and Oily and Fatty Matters from Wool and Other Substances and the Apparatus Connected Therewith and Applicable Thereto, (for which I have obtained a patent in Great Britain No. 4;262, dated October 21, 1879; in France No. 136,292, dated April 23, 1880; in Belgium No. 51,298, dated April 27, 1880, and in Austria-Hungary No. 20,377 and No. 30,623, dated October 14, 1880, and in Germany No. 13,262, dated April 27, 1880;) and I do hereby declare that the following is a full, clear, and exact description of the invention, which will enable others skilled in the art to which it appertains to make and use the same.

My invention relates principally to the extraction of oil and fat and oily and fatty matters from wool; but it is also equally applicable to the extraction of oily and fatty matters from woolen yarns or fabrics, and such other fibrous material or mixtures of materials as are from their nature affected in color or quality when hydrocarbons are used for the purpose of extracting such oily and fatty matters, and are subsequently removed from the material under treatment by the slow process of admitting steam or using other means of raising the temperature to the respective boiling-points of such hydrocarbons, and so driving them off by evaporation.

The primary object of this invention therefore is to provide suitable apparatus and a process whereby oily and fatty matters may be extracted by the use of hydrocarbons without employing heat, and whereby I avoid causing injury by the agency of heat to the materials operated upon; and for this purpose I provide a cylindrical or other shaped vessel of suitable dimensions constructed of iron or other material, and furnished with a cover capable of being lifted or removed and rendered tight by a suitable joint or packing. Inside of this vessel I place a perforated or reticulated or otherwise suitably-constructed cage or basket, which may either be a fixture or be so fitted as to be capable of being lifted or otherwise moved into and out of position, and which said cage or basket will be adjusted in such a manner as to be capable of being made to revolve within the outer vessel by some one or any of the various modes of producing centrifugal action. Into this cage or basket I place the material to be treated (or the cage or basket may be first filled and afterwards placed in position) and adjust the cover, when I admit, by suitable contrivances such as are hereinafter more particularly described, carbon bisulphide, (which I hereinafter for convenience designate as the "agent,") which, passing through the material, separates and removes the oily and fatty matters contained therein, and then runs off by suitable means into a tank or reservoir or direct into a still. This operation is continued until the material is cleared of such oily and fatty matters, which is easily ascertained by examination. When this is affected, the agent remaining in the vessel is allowed to return to a tank or suitable reservoir, which operation can, when the bulk of the agent has run off, be speedily completed by setting in motion the revolving basket or cage containing the material. Water is then admitted either under pressure or otherwise for the purpose of cleansing or partially cleansing the material and of washing out any agent which may remain, and the resulting liquid is allowed to pass off into a suitable reservoir, from whence the agent, (if any be present,) may be recovered. The revolving basket or cage containing the material is then again set in motion, as before mentioned, and is continued in action until the material is dry. To assist this operation, I in some cases employ a fan or blower or adopt other suitable means for producing a current of air, which in a cold or heated state is forced through the material intended to be dried. In some cases the air may if necessary be chemically or otherwise treated; but neither of these last-mentioned contrivances is a necessary adjunct to the apparatus connected with my invention.

In order that my said invention may be fully understood, I shall now proceed more particularly to describe the same, and for that purpose the accompanying drawings are appended as an illustration, the same letters of reference indicating like parts in all the figures.

Figure 3:
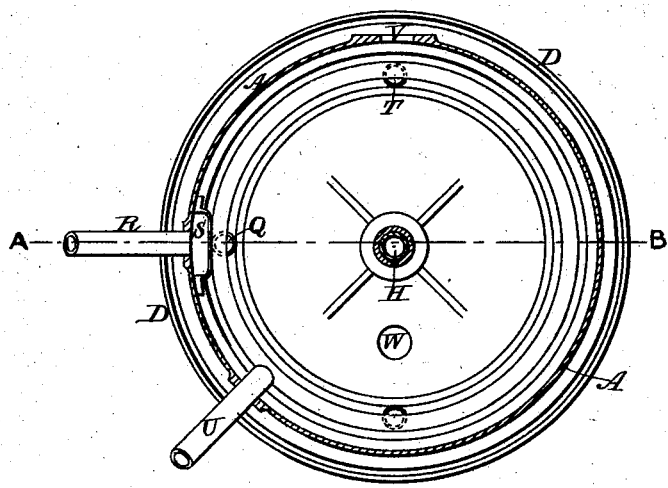
Figure 2:
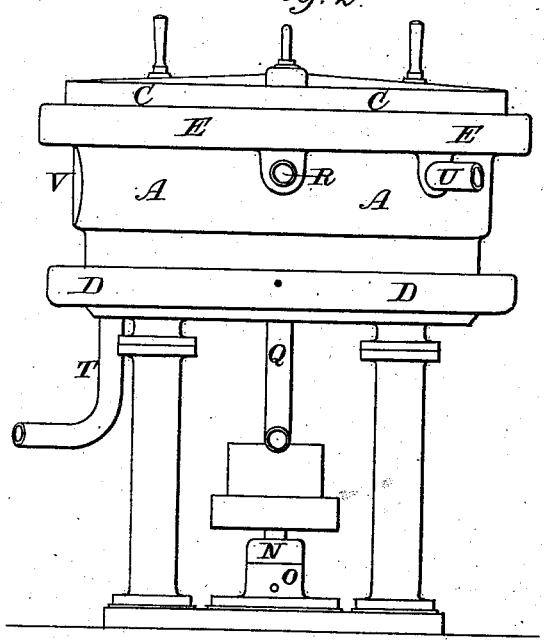

Figure 1 is a sectional elevation on line A B of a centrifugal drying-machine, designed and constructed especially to meet the requirements of this invention. Fig. 2 is an outside elevation of the same machine. Fig. 3 is a sectional plan on line C D of the same machine.

It is to be observed that the necessity of employing oil or grease for any of the bearings or moving parts of the apparatus with which the chemical agent employed may come in contact is wholly avoided, and this is an important feature in this part of my invention; but the same result may be obtained by constructing the apparatus in such a way that the bearings can be placed toward the top of the spindle, (which might be lengthened,) and above the overflow, a level to which the agent will rise, and in this instance ordinary oiled bearings might be used.

A A is a case of cylindrical or other suitable form, B B a bottom plate for same, and C C a cover, all of which are constructed of iron or other suitable material or materials.

The bottom plate, B B, is secured to the case A A by means of a faced and ground flanged joint bolted or secured in any other convenient manner. The outside edge of the bottom plate is constructed with a lip, D D, forming a trough for the reception of water, which will cover the connecting-joint between base and bottom plate. In this bottom plate immediately within the case A A is formed a channel or gutter, P P, for the purpose of draining the interior. Around the top of the case A A another lip or trough, E E, similar to that described on B B is provided, into which the rim of the cover F F is made to drop, thus forming, when the trough is filled with water, a sealed joint, similar to the joint lastly before described.

The surfaces in contact between cover and case are faced and ground. A bayonet or other suitable joint for securing the cover to the case may be provided.

Figure 5:
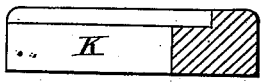
Figure 4:
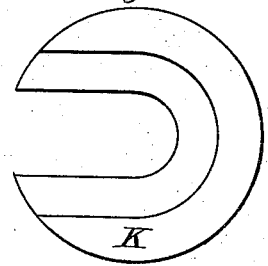

The bottom plate, B B, is provided with a cone in the center, which carries at its top a conical bearing, G, for a central sprindle, H. On this spindle is fitted a perforated or reticulated or otherwise suitably constructed basket, I I, with an open top, so adjusted as to be capable of being lifted into and out of position, and firmly secured by suitable appliances to the central spindle, H. To prevent loss of time, and to avoid the necessity of striking any blow in the process of securing or removing the basket, I prefer to use the following device: To the top of the spindle I fit a deep nut, L, the outside diameter of which is smaller than the bore of the boss of the basket. I introduce a washer, K, (see Figs. 4 and 5,) recessed on its upper side one-fourth of an inch deep to receive the nut and cut through on one side, so that it may be withdrawn sidewise from the spindle when the nut is lifted out of the recess, and the basket may then be lifted out of position. By this means it is only necessary to slacken or tighten the nut one-fourth of an inch to remove or fix the basket.

The lower portion of the cone or bottom plate, B B, is formed into a stuffing-box and is fitted with a gland, M. The lower end of the spindle H is made to run in a step, N, fitted with steel anti-friction disks, which, by means of a passage through the side of the step or some other suitable contrivance are placed in communication with a water-box, O, so that the bearing of the spindle runs in water. The step N, the gland M, and cone-bearing G are all fitted with metal-lined bushes with phosphor-bronze or other suitable matrix, the purpose being to avoid the necessity for use of any oleaginous lubricant. A rotatory motion is given to the spindle by a pulley and belt or other suitable appliances.

A hole is provided in gutter P P, in which is fitted a pipe, Q, for the introduction of the agent. A second hole and pipe, R, are provided near the top of the case A, immediately under the trough E E, for the overflow of the agent. Inside the case A A, and opposite to the pipe R, I prefer to fit a collecting-box, S, the upper lip of which is placed as close as is convenient to the under side of the cover C C, for the purpose of making the effective outlet for the agent as high as possible. Another pipe and hole, T, Fig. 3, are provided, communicating with the gutter P P, by means of which the case may be drained of the agent. Another hole and pipe, U, are also provided immediately below the trough E E and in the side of the case A A, communicating with a distributing-pipe or suitable apparatus in the interior of the case, so arranged as to produce a fine spray or continuous thin sheet of water falling to the basket. An opening and pipe, V, may be provided in the side of the case A A, through which a fan-blast may be introduced, or other means may be provided for assisting the operation of drying. A corresponding opening and pipe, W, may be provided in the bottom plate, B B, for the exit of blast and vapor. All these pipes are to be provided with valves, and each may be opened or closed independently of the others.

For convenience, only one pipe for each purpose is exhibited in the drawings; but any number and of any diameter may be provided to suit special circumstances.

I prefer the basket and the interior of the case to be tinned, enameled, or otherwise suitably coated, and that the pipes should be of lead or galvanized iron or other material treated to prevent oxidation.

The mode of conducting the operation is as follows: The basket being filled with the material to be treated and the troughs D D and E E filled with water, I remove the cover C C by suitable appliances and adjust the basket I I in position upon the spindle H, and secure it as above described; or the basket may be filled without being removed from the case. I then replace the cover and admit the agent through the pipe Q, which, rising through the material, separates and removes the oily and fatty matters therein contained, and, flowing over the top of the collecting-box S, runs off by the pipe R into a tank or reservoir or direct into a still. This operation is continued until the material is cleared of grease, a test for which may be provided by means of a small cock in the pipe R. When this is effected, the valve in the pipe Q is closed and that in the pipe T, Fig. 3, is opened, allowing the agent remaining in the vessel to flow off to a tank or reservoir suitably placed near the machine. To complete this operation, I set in motion, by belt or gearing moved by steam or other power in the ordinary way, the spindle and basket. When the agent has been thrown off, I stop the machine by means of a brake or other contrivance, and introduce water under pressure or otherwise through the pipe U, Fig. 3, and spray-pipe before described, for the purpose of cleansing or partially cleansing the material and of washing out any of the agent which may remain. I adopt the device of introducing water in the form of a finely-disseminated spray or thin continuous sheet of water, which will be found beneficial in hot climates or generally in heated temperatures, in order that any vaporized agent may be condensed and precipitated. The water and agent (if any) escapes by way of the pipe T, Fig. 3, to the storage-tank before referred to or to some other suitable reservoir, where the agent (if any) may be recovered. The revolving basket is then again set in motion, as before described, and is continued in action until the material is dry, when the valve in the pipe T may be closed. To complete this operation I adjust, where necessary, a fan or blower or other suitable contrivance for obtaining a current of air, and the air so forced through enters by the pipe V, Figs. 2 and 3, and escapes by the pipe W, Fig. 3, both of which have hitherto been closed by suitable valves. The air so used may be chemically or otherwise treated.

I am aware that bisulphide of carbon has been used as an agent in the extracting of grease, and therefore I make no claim to it *per se* for such purpose.

Having thus particularly described and ascertained the nature of this my said invention, together with the best method with which I am acquainted for carrying the same into practical effect, I wish it to be understood that I do not confine myself to the precise details hereinbefore described, and illustrated in the accompanying drawings, as the same may be varied without departing from the nature of the invention; but What I consider to be novel and original, and therefore claim, is—

1. The described process, whereby bisulphide of carbon may be practically used as a grease-extractor and be subsequently separated from the material under treatment by centrifugal force without the use of heat and consequent vaporization.

2. The combination, substantially as described, of an outer vessel provided with a removable cover and packing, an interior basket arranged to be revolved, means for admitting the cleansing agent, means for the admission of water, and means for running off the cleansing agent.

THO. J. MULLINGS.

Witnesses:
F. PRICE,
E. LAKE.